United States Patent
Smith et al.

(10) Patent No.: US 10,333,969 B2
(45) Date of Patent: *Jun. 25, 2019

(54) EVENT DRIVEN ROUTE CONTROL

(71) Applicant: Level 3 Communications, LLC, Broomfield, CO (US)

(72) Inventors: Robert Smith, Irvine, CA (US); Shawn Marck, San Francisco, CA (US); Christopher Newton, Westlake Village, CA (US)

(73) Assignee: Level 3 Communications, LLC, Broomfield, CO (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/155,587

(22) Filed: Oct. 9, 2018

(65) Prior Publication Data

US 2019/0052670 A1    Feb. 14, 2019

Related U.S. Application Data

(63) Continuation of application No. 15/707,772, filed on Sep. 18, 2017, now Pat. No. 10,097,579, which is a (Continued)

(51) Int. Cl.
*H04L 29/06* (2006.01)

(52) U.S. Cl.
CPC .......... *H04L 63/1458* (2013.01); *H04L 63/20* (2013.01)

(58) Field of Classification Search
CPC ... H04L 63/1458; H04L 63/145; H04L 63/20; H04L 63/1416; H04L 63/1425; H04L 63/1433; H04L 63/1441; H04L 63/1466

(Continued)

(56) References Cited

U.S. PATENT DOCUMENTS

| 7,478,429 B2 | 1/2009 | Lyon |
| 7,546,635 B1 | 6/2009 | Krohn |

(Continued)

FOREIGN PATENT DOCUMENTS

| EP | 1705863 | 9/2006 |
| WO | WO-2008001247 A2 | 1/2008 |

OTHER PUBLICATIONS

Extended European Search Report, dated Mar. 27, 2018, Application No. 15840780.9, filed Sep. 14, 2015; 6 pgs.

(Continued)

*Primary Examiner* — Hosuk Song (57) ABSTRACT

Embodiments provide system and methods for a DDoS service using a mix of mitigation systems (also called scrubbing centers) and non-mitigation systems. The non-mitigation systems are less expensive and thus can be placed at or near a customer's network resource (e.g., a computer, cluster of computers, or entire network). Under normal conditions, traffic for a customer's resource can go through a mitigation system or a non-mitigation system. When an attack is detected, traffic that would have otherwise gone through a non-mitigation system is re-routed to a mitigation system. Thus, the non-mitigation systems can be used to reduce latency and provide more efficient access to the customer's network resource during normal conditions. Since the non-mitigation servers are not equipped to respond to an attack, the non-mitigation systems are not used during an attack, thereby still providing protection to the customer network resource using the mitigation systems.

20 Claims, 6 Drawing Sheets

Related U.S. Application Data continuation of application No. 14/852,518, filed on Sep. 12, 2015, now Pat. No. 9,769,202.

(60) Provisional application No. 62/050,000, filed on Sep. 12, 2014.

(58) Field of Classification Search
USPC .......................... 726/1, 22–25; 709/223–225
See application file for complete search history.

(56) References Cited

U.S. PATENT DOCUMENTS

| | | | |
|---|---|---|---|
| 7,665,135 B1 | 2/2010 | Mohiuddin | |
| 7,694,338 B1 | 4/2010 | Jafari | |
| 7,730,536 B2 * | 6/2010 | Pasko | H04L 63/1458 726/12 |
| 7,966,661 B2 * | 6/2011 | Gunawardena | H04L 47/10 726/23 |
| 7,987,493 B1 | 7/2011 | Reams et al. | |
| 8,230,504 B1 * | 7/2012 | Jafari | H04L 63/1458 726/22 |
| 8,255,996 B2 | 8/2012 | Elrod | |
| 8,387,144 B2 * | 2/2013 | Gunawardena | H04L 47/10 726/23 |
| 8,510,826 B1 | 8/2013 | Reams | |
| 8,615,785 B2 | 12/2013 | Elrod | |
| 8,839,427 B2 | 9/2014 | Morrow | |
| 8,955,112 B2 | 2/2015 | Nguyen | |
| 8,966,622 B2 | 2/2015 | Dickinson | |
| 9,094,445 B2 | 7/2015 | Moore | |
| 9,197,666 B2 | 11/2015 | Carney | |
| 9,497,215 B2 * | 11/2016 | Vasseur | H04L 63/1458 |
| 9,742,795 B1 * | 8/2017 | Radlein | H04L 63/1441 |
| 9,769,202 B2 | 9/2017 | Smith | |
| 10,097,579 B2 * | 10/2018 | Smith | H04L 63/1458 |
| 2004/0148520 A1 | 7/2004 | Talpade et al. | |
| 2007/0201483 A1 | 8/2007 | Gerasimov et al. | |
| 2009/0293123 A1 | 11/2009 | Jackson et al. | |
| 2010/0138921 A1 | 6/2010 | Na et al. | |
| 2014/0006641 A1 | 1/2014 | James et al. | |
| 2014/0090061 A1 | 3/2014 | Avasarala et al. | |
| 2014/0096251 A1 | 4/2014 | Doctor et al. | |
| 2016/0080412 A1 | 3/2016 | Smith et al. | |
| 2018/0007086 A1 | 1/2018 | Smith | |

OTHER PUBLICATIONS

International Preliminary Report on Patentability, dated Mar. 14, 2017, Int'l Appl. No. PCT/US15/049956, Int'l Filing Date Sep. 14, 2015; 9 pgs.

International Search Report dated Dec. 14, 2015, Int'l App. No. PCT/US15/049956, Int'l Filing Date Sep. 14, 2015; 3 pgs.

Written Opinion of the International Searching Authority dated Dec. 14, 2015, Int'l Appl. No. PCT/US15/049956; Int'l Filing Date Sep. 14, 2015; 7 pgs.

* cited by examiner

EVENT DRIVEN ROUTE CONTROL

RELATED APPLICATIONS

This application is a continuation of and claims the benefit of priority from U.S. Non-Provisional patent application Ser. No. 15/707,772, filed Sep. 18, 2017, titled "EVENT DRIVEN ROUTE CONTROL," the entire contents of which are fully incorporated by reference herein for all purposes. application Ser. No. 15/707,772 is a continuation of and claims the benefit of priority from U.S. Non-Provisional patent application Ser. No. 14/852,518, filed Sep. 12, 2015, titled "EVENT DRIVEN ROUTE CONTROL," the entire contents of which are fully incorporated by reference herein for all purposes. application Ser. No. 14/852,518 claims the benefit of priority from U.S. Provisional Patent Application No. 62/050,000, filed Sep. 12, 2014, titled "EVENT DRIVEN ROUTE CONTROL," the entire contents of which are fully incorporated by reference herein for all purposes.

BACKGROUND

In a distributed network like the Internet, different computers and computer networks may be virtually connected and accessible via various routes. When a computer or computer network is under attack, e.g., a distributed denial of service (DDoS) attack, responses to the attack must be made in order to maintain the network's accessibility to other networks and computers. The solution of typical systems is to always route malicious traffic through scrubbing centers that are designed to respond to an attack. As the scrubbing centers always receive the traffic, they can respond to an attack.

But such a solution has some undesirable properties. The scrubbing centers are very expensive. Thus, there is a lack of scrubbing centers throughout a network, due to the high cost. Having to route all traffic through too few of scrubbing centers would typically require routing through remote locations, introducing latency due to traversing data over long distances.

Embodiments of the invention address these and other problems, individually and collectively.

BRIEF SUMMARY

Embodiments provide system and methods for a DDoS service using a mix of mitigation systems (also called scrubbing centers) and non-mitigation systems. The non-mitigation systems are less expensive and thus can be placed at or near a customer's network resource (e.g., a computer, cluster of computers, or entire network). Under normal conditions, traffic for a customer's resource can go through a mitigation system or a non-mitigation system. When an attack is detected, traffic that would have otherwise gone through a non-mitigation system is re-routed to a mitigation system. Thus, the non-mitigation systems can be used to reduce latency and provide more efficient access to the customer's network resource during normal conditions. Since the non-mitigation infrastructure is not equipped to respond to an attack, this infrastructure is bypassed during an actual attack for the specific client under attack, thus not interfering with the mitigation process Accordingly, techniques can be provided for event driven route control (EDRC) in a system that mitigates distributed denial of service (DDOS) attacks on a network. EDRC is a dynamic, automated system for rerouting network traffic toward critical resources (mitigation systems) based on events (e.g., signals and alerts) from network analysis. Embodiments can use Traffic Engineering (TE) based on information input and business requirements to determine how traffic should be re-routed to a mitigation system. The mitigation network (including mitigation and non-mitigation systems) can be programmed to re-route traffic according to predetermined rules, e.g., based on the TE analysis. Thus, the re-routing can occur in a predictable way In one implementation, one re-routing scheme is used once an event is detected. Properties of the network (or other factors) can used in determining which routing state to choose. In another implementation, a re-routing scheme can be chosen from a plurality of possible re-routing schemes. Which re-routing scheme is selected can be based on a variety of factors. Example factors for determining a routing state and/or which re-routing scheme to use can include properties of the type of attack, a rate of requests, and the like. Thus, a dynamic automated network can be provided for rerouting network traffic in response to detected network events.

Other embodiments are directed to systems, portable consumer devices, and computer readable media associated with methods described herein.

A better understanding of the nature and advantages of embodiments of the present invention may be gained with reference to the following detailed description and the accompanying drawings.

DETAILED DESCRIPTION

I. Networks, Routing, and BGP

The Internet is a collection of connected autonomous systems, the systems under the control of one or more network operators. On the Internet, an autonomous system is a collection of connected IP routing prefixes that presents a common, clearly defined routing policy to the Internet. In a distributed network like the Internet, different computers and computer networks may be virtually connected and accessible via various routes.

The way that the systems are connected to each other comprises the routing of the Internet. The Border Gateway Protocol (BGP) is a standardized exterior gateway protocol designed to exchange routing and reachability information between the autonomous systems on the Internet, allowing the creation of a loop-free routing topology among autonomous systems. BGP can also be used for routing within an autonomous system. Once peer machines have been configured to exchange routing information, they will form a TCP connection and can begin communicating in BGP.

As defined in at least RFCs 1771, 1997, and 4271, BGP communities are a group of destinations that share some common property. Each autonomous system administrator may define which communities a destination belongs to. By default, all destinations belong to the general Internet community. They are attribute tags that can be applied to incoming or outgoing prefixes to achieve some common goal, for example which routing information a system accepts, prefers or distributes to other neighbors.

The community attribute allows for grouping of communities, to which common routing decisions, for example acceptance, preference, and redistribution can be applied. Community Strings are applied by routers according to rules expressed in the router's configuration. These are commonly known as routing policies. Several common, predefined community attributes are: "no-export," which causes the route to not be advertised to external peers, "no-advertise," which cause the route to not be advertised to any peer, and "internet," which causes the route to be advertised to the entire Internet community.

Unlike with other protocols, BGP does not broadcast its entire routing table. Instead only upon startup, peers will hand over their entire routing table. After that time, update messages are used to change routing. Route updates are applied to the Routing Information Base (RIB), which can contain multiple paths to a destination. Each router must decide which of these routes will make it into the routing table, and thus, which paths will be used. If a route is withdrawn, another route to the same destination can be taken from the RIB, if available.

As well as using attributes, BGP uses classless inter-domain routing (CIDR) to reduce the size of the routing tables. CIDR is a process for exchanging routing information of prefixes and prefix lengths without regard to address classes (e.g., 192.168.2.0/24 for IPv4 addresses, and 2001: db8::/32 for IPv6 addresses).

Figure 1:
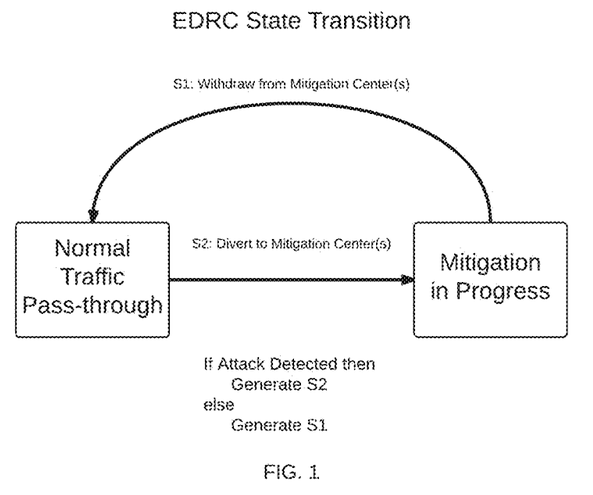
FIG. 1 shows the state transition between mitigation and non-mitigation for the EDRC system according to embodiments of the present invention.

FIG. 1 shows a state transition diagram between mitigation and non-mitigation for the EDRC system, which depicts the "Normal Traffic Pass-through" state of the system, the event which triggers the scrubbing process ("Scrubbing in Progress" state), as well as the conditions for returning to the "Normal Traffic Pass-through" state. Cycling is triggered by the detection of an attack or the absence of an attack.

II. Mitigation System

Figure 2:
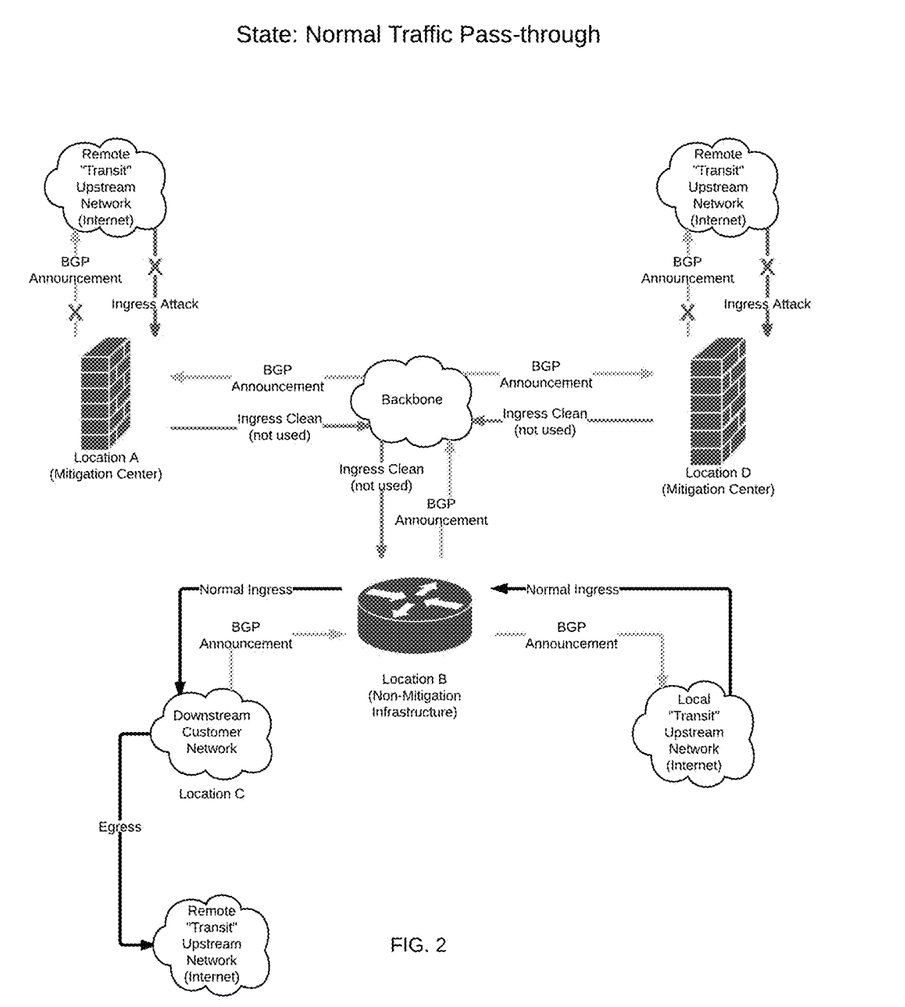
FIG. 2 shows the state "Normal Traffic Pass-through" according to embodiments of the present invention.

FIG. 2 shows a network (autonomous system) connected by a backbone, with two locations in a single autonomous system connected to several external autonomous systems all employing BGP for routing. The network has two types of non-discrete physical locations, location A and location B. Location A corresponds to a mitigation system, and location B corresponds to a non-mitigation system.

FIG. 2 shows the state "Normal Traffic Pass-through". In this state, the network is monitoring for attacks that ingress through Location B. Route announcements (e.g. BGP) from the customer Location C are received at Location B; while there is no attack, the route announcement is re-announced throughout the network over the backbone with a specific attribute that tells the rest of the network about the route but not to re-announce which leaves Locations A and D unused. This gives Location B exclusivity for receiving Normal Ingress from the Local "Transit" Upstream Network (Internet). The exclusivity gives the advantage of monitoring/detecting for attack traffic and providing for a first line of defense to customer Location C.

In this example, location A also has local network attack detection and mitigation with dynamic routing for diversion capabilities, and location B does not have mitigation capabilities. Location B is typically at or near customer Location C, and thus provides quicker access to customer Location C. For example, location B can be at a same data center as customer Location C.

In FIG. 2, customer Location C is announcing their network to the Internet via location B. Therefore, any traffic entering the network at location A destined for customer Location C traverses a backbone to location B and onto customer Location C. Also traffic that enters the network via location B will be forwarded to customer Location C. Other configurations are possible, such as location A being able to send traffic to customer Location C over the backbone, without having to go through location B. But, given that location B is at or near customer Location C, it can be advantageous to send the traffic through location B.

The RIB keeps track of routes that are available for use. In the case that a route is to be removed or withdrawn and not used (meaning it is only contained in the RIB), then the route can be deleted from the RIB without sending an update to any peers. Entries in the RIB stay in the RIB until removed.

The mitigation network in FIG. 2 can also include a central server that is in communication with the mitigation systems and the non-mitigation systems. The central server can coordinate the systems and can be used in re-routing.

III. Network Attacks and Mitigation

In embodiments, when a distributed network with multiple physical locations participating as one autonomous system is attacked, sensors throughout the network are able to detect the threat and the mitigation network can inject specific routes for the destination that is under attack to redirect malicious traffic through security zones where mitigation can take effect. These security zones are often called scrubbing centers.

A scrubbing center is generally a set of appliances that is used by a network when an attack is detected, by routing all traffic through the scrubbing center via BGP announcements, for the duration of an attack. The scrubbing center can absorb large amounts of traffic, and only send back the legitimate traffic. Scrubbing centers can suffer from a few drawbacks. By sending all data to a scrubbing center, latency can be introduced. But, embodiments can solve this problem by routing traffic to the scrubbing centers when needed, but otherwise use one or more non-mitigation systems (which are cheaper and can be easily placed near a customer's network) when no attacks are present.

IV. Event Driven Route Control

Figure 4:
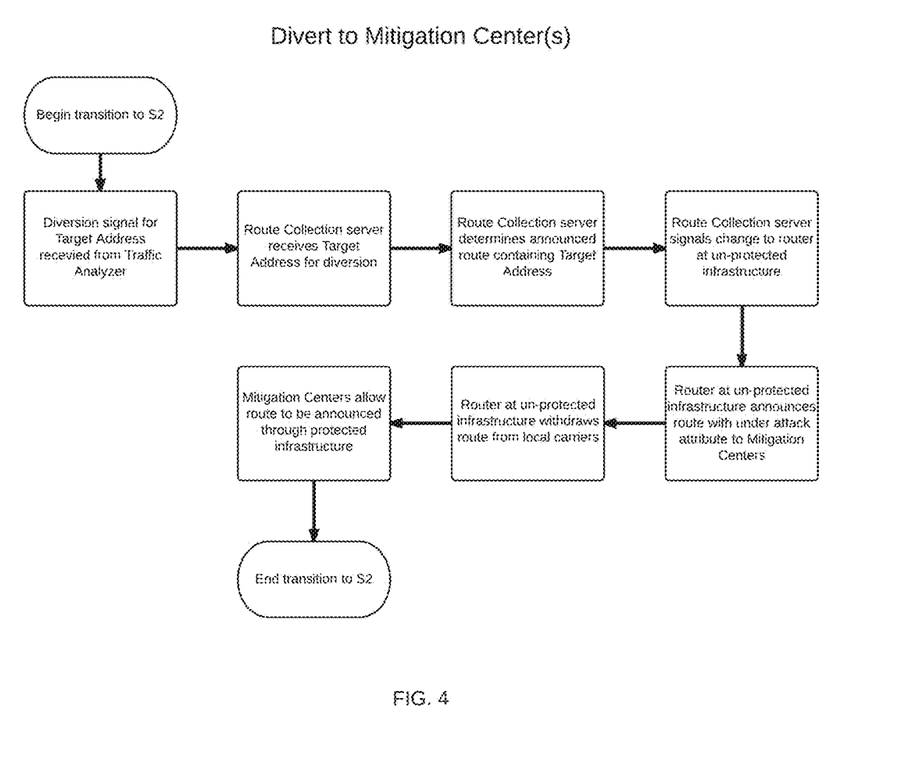
FIG. 4 shows the transition "Divert to Mitigation Center (s)" according to embodiments of the present invention.

In response to an attack, the routing in FIG. 2 can be changed per process flow described in FIG. 4. Embodiments can provide a mitigation network that automatically responds to an attack by changing routing (e.g., in response to a change in community tagging) such that traffic is routed to the mitigation systems shortly after an anomaly is detected in the non-mitigation system. In one example implementation, BGP commands can be sent to update the routing for a network. Route change can be added, removed, or modified. Predefine route changes to respond to the attack can be installed on the mitigation network, e.g., at a central server, at or some or all of the mitigation or non-mitigation systems. Various pre-defined routing schemes can be used, where the selection routing scheme can depend on current properties of the customer's network, the mitigation network, and other parts of the Internet.

In another example implementation, a routing (or re-routing) scheme corresponds to one or more entries in a Domain Name Service (DNS) system and are implemented by routing devices that operate, at least partially, as DNS resolvers. As such, a routing scheme can correspond to one or more DNS entries associated with a non-mitigation system, while another routing scheme can correspond to one or more DNS entries associated with a mitigation system. Thus, when a network anomaly event (e.g., DDoS attack) is detected by a mitigation service of a customer, the mitigation service can direct or re-route customer-bound traffic from a non-mitigation system to a mitigation system using DNS. For example, in response to the anomaly detection, the mitigation system can communicate updates (e.g., DNS zone transfer) to one or more DNS resolvers therefore causing the one or more DNS resolvers to update from a non-mitigation DNS zone (i.e., associated with the non-mitigation system of the mitigation service) to a mitigation DNS zone (i.e., associated with the mitigation system of the mitigation service). By updating from a non-mitigation DNS zone to a mitigation DNS zone, the DNS resolvers therefore effectively direct or re-route traffic from the non-mitigation system to the mitigation system of the mitigation service. As will be discussed further below, once a network anomaly or attack event is determined to no longer be a threat, customer-bound traffic can then be directed or re-routed from the mitigation system back to the non-mitigation system of the mitigation service using the same technique (e.g., communicating updates to DNS resolver(s) via DNS zone transfer).

The mitigation network (e.g., implementing EDRC) can inspect traffic to identify an attack event on a customer network, and automatically implement the appropriate routing changes to mitigate the attack. Once an attack is determined to be taking place for a specific address, the mitigation network can use an address aggregation and search algorithm to determine the announced prefix of the targeted address. The mitigation network can then use additional BGP commands to modify the routing in response to the attack.

The mitigation network can have a set of a rules for responding to attacks on specific autonomous systems or specific machines. The rules can consist of route modifications to implement by sending BGP commands. By having a set of responses defined in advance, the mitigation network can automatically respond when an attack is detected, instead of waiting for network administrators to manually respond. Route changes can include adding, removing, or modifying a route.

A. System with Dynamic Routing

Figure 3:
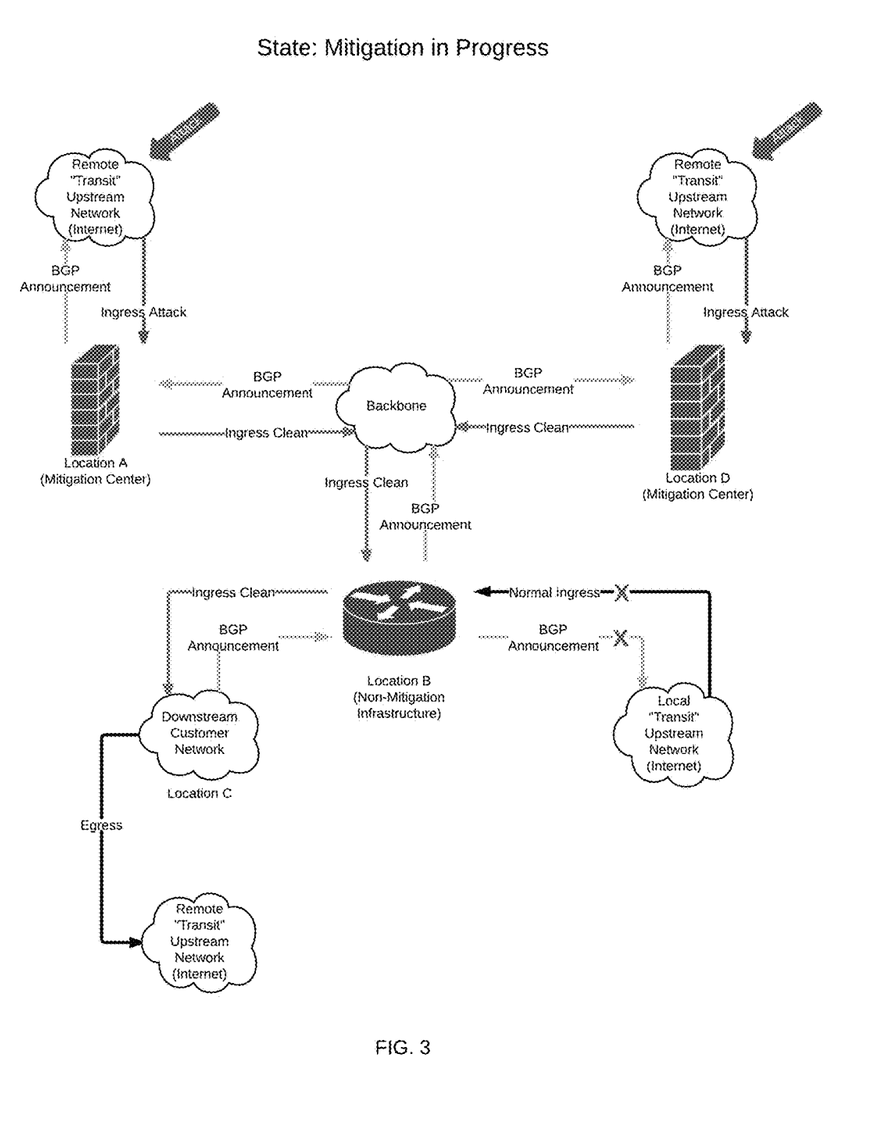
FIG. 3 shows the state "Mitigation in Progress" according to embodiments of the present invention.

FIG. 3 shows the autonomous system of FIG. 2 under attack, and a response to the attack by modifying the routing (per process flow described in FIG. 4) within the autonomous system according to embodiments of the present invention. The network has two non-discrete physical locations (location A and location B) in a single autonomous system. In the figure, each location A and D have local network attack detection and mitigation with dynamic routing for diversion capabilities and location B does not; however, it does provide traffic sampling data to the detection capabilities in one or more locations A and D.

Customer at location C has announced their network to the autonomous system via a physical direct connection or over a tunnel (e.g. GRE) to location B, therefore any traffic entering the network at location A destined to Customer at location C traverses a backbone to location B and onto Customer at location C.

FIG. 3 shows a state "Mitigation in Progress". In this state the network is mitigating attack traffic which ingress through Locations A and D. Route announcements (e.g. BGP) from the customer Location C are received at Location B; while there is an attack, the route announcement is re-announced throughout the network over the backbone with a specific attribute that tells the rest of the network about the route and to re-announce the route through Mitigations Centers (Locations A and D) enabling Location B to receive Ingress Clean traffic. Location B has withdrawn the route announcement from Local "Transit" Upstream Network (Internet) preventing Normal Ingress traffic from being received.

FIG. 3 depicts a mitigation in progress. Thus, an X is shown between location B and the transmit upstream network. This signifies that traffic is no longer being routed to location B. The other lines show that traffic through mitigation systems at location A send their scrubbed traffic to location B, for sending to customer network C. In other embodiments, the traffic could be send directly to customer network C, without going through location B.

A method for providing a mitigation service for a customer network resource can be provided according to embodiments of the present invention. The method can be performed by the mitigation network. Certain steps can be performed by any part of the mitigation network, e.g., one or more mitigation systems, one or more non-mitigation systems, and a central server. The customer network resource can be a customer network or a computer hosting a website of the customer.

In step 1, a non-mitigation system of a mitigation network receives first network traffic bound for a customer network resource. The non-mitigation system receives the first network traffic according to a first routing scheme. At least a portion of the first network traffic does not pass through a mitigation system of the mitigation network before being received by the non-mitigation system. For example, location B in FIG. 2 can receive network traffic from an upstream network. This traffic does not need to go through a mitigation system, as an attack has not been detected. The non-mitigation system can be at or near the customer network resource.

In step 2, the non-mitigation system can send the first network traffic to the customer network resource. The non-mitigation might analyze the data and perform some simple filtering, but does not perform mitigation, as is performed by the mitigation systems. Thus, the term non-mitigation means that the system does not have the full capabilities of a mitigation system.

In step 3, the mitigation network detects an attack event of the customer network resource. The detection can be performed at locations A or B, or other parts of the mitigation network, and may be done by any suitable technique.

In step 4, the mitigation network determines a second routing scheme that routes second network traffic to one or more mitigation systems of the mitigation network. The second network traffic would have been routed to the non-mitigation system under the first routing scheme without passing through a mitigation system of the mitigation network. Thus, traffic that would have gone to the non-mitigation system is now re-routed to a mitigation system.

In one embodiment, the second routing scheme can be selected from a plurality of possible routing schemes. Criteria can be used for determining which routing schemes to select. One or more properties can be determined of any one or more of the following: the attack event, the mitigation network, and the customer network resource. The second routing scheme can then be selected based on the one or more determined properties. The possible routing schemes can be predetermined before the attack event is detected. A central server of the mitigation network can determine the second routing scheme.

In step 5, the mitigation network communicates the second routing scheme to one or more routing devices. A routing device can be any part of the Internet that performs forwarding or participates in a routing protocol. The one or more routing devices ensure that the second routing scheme is followed to route traffic to the mitigation systems, and not the non-mitigation system, during an attack. After the attack is over, the first routing scheme can be re-introduced, or another routing scheme can be provided that does route traffic to the non-mitigation system.

The second routing scheme can be communicated to one or more routing devices by providing updates via a routing protocol.

In step 6, the one or more mitigation systems receive the second network traffic. Some of the second network traffic could go to one mitigation system and some to another mitigation system, e.g., based on where the traffic originates from.

In step 7, the one or more mitigation systems process the second network traffic according to one or more mitigation rules. The one or more mitigation rules can be any suitable mitigation rule, e.g., as described in U.S. patent application Ser. No. 13/458,129, filed on Apr. 27, 2012, and entitled "System And Method For Mitigating Application Layer Distributed Denial of Service Attacks Using Human Behavior Analysis," the entirety of which is hereby incorporated by reference herein.

B. Example Attack and Response

Embodiments can involve a software route analysis tool, which may use BGP communities to re-inject specific "calls to action" via BGP routes back into the network. Embodiments can do this by taking a programmatic approach to interpreting BGP routes as signals or a series of "call to action" commands. The mitigation network can receive a route that's been injected by an automatic black or white box system, network administrators, customers and applications (via API's). The mitigation network can then correlate these routes or signals with actions that are defined in a dataset or database (this step can be a recursive lookup to an authoritative database or a locally defined action). Finally mitigation network can take the appropriate action, e.g., in the form of installing a route with a specific action into the local network's routing environment. Herein, EDRC can refer to embodiments installed at any system with the mitigation network to perform certain actions.

In one embodiment, when the attack is detected at location A, a locally significant route (LSR), in this example, 1.2.3.4/32 with next hop 5.6.7.8/32 and community 1234:1234, is installed in location A's routing environment. This enables attack traffic to be redirected to another device or series of devices which provide filtering services, and the net result is only legitimate traffic is forwarded onto the destination network.

The LSR is exported from location A to the EDRC Management system, and EDRC will interpret the LSR for location A as a signal to analyze the route and look for an aggregate of "1.2.3.4/23" because it detected the community "1234:1234."

In response, the EDRC finds a match for 1.2.3.4/32 as 1.2.3.0/24 and the community 1234:1234 is defined as "local no export," a community defined within BGP. EDRC then installs the following route into the local routing environment for location B. 1.2.3.0/24 next hop 5.6.7.8 community 1234:0000. The local routing policies in location B network will withdraw 1.2.3.0/24 from peer networks because of the community 1234:0000 found in the route table. Thus, a specific route to location B is closed.

FIG. 4 is a flowchart showing the response to an attack on a network according to embodiments of the present invention. It shows the transition "Divert to Mitigation Center(s)." This logic diagram illustrates from a high level how the network changes, step by step, from "Normal Traffic Pass-through" to "Mitigation in Progress." In this example, a high risk network is withdrawn from low risk locations in response to an attack. To begin, an anomaly or event, consisting of a network attack is detected by network analysis tools in a network protected by an EDRC system. The detection can be done using techniques known to one skilled in the art.

As shown in FIG. 4, in response to the event detection, a local alert is generated, and a BGP route (or other route) for local diversion is injected into the network. The new route can be injected by any of the systems of the mitigation network (e.g., a central server, a mitigation system, or a non-mitigation system). This BGP route is then exported across the network backbone to other remote networks that are not protected. It is commonplace in a network that not every device on the network is equipped with a mitigation zone, or has the local detection or mitigation. EDRC provides protection to these machines by sending them updated route information to divert around one or more autonomous systems being under attack The EDRC system will then perform a lookup of the BGP route to see if it matches an aggregate route. If it does, then further analysis of the route sees if the route matches an aggregate route received by a peer. If that is true, then the aggregate route can be appended with the community for localized do-not-export community, e.g., by sending the appropriate BGP command. This can allow the EDRC system to complete the rerouting in response to the attack by expanding or traversing an aggregate route and sending the appropriate BGP message to the appropriate network machines.

C. Return to Normal State

Figure 5:
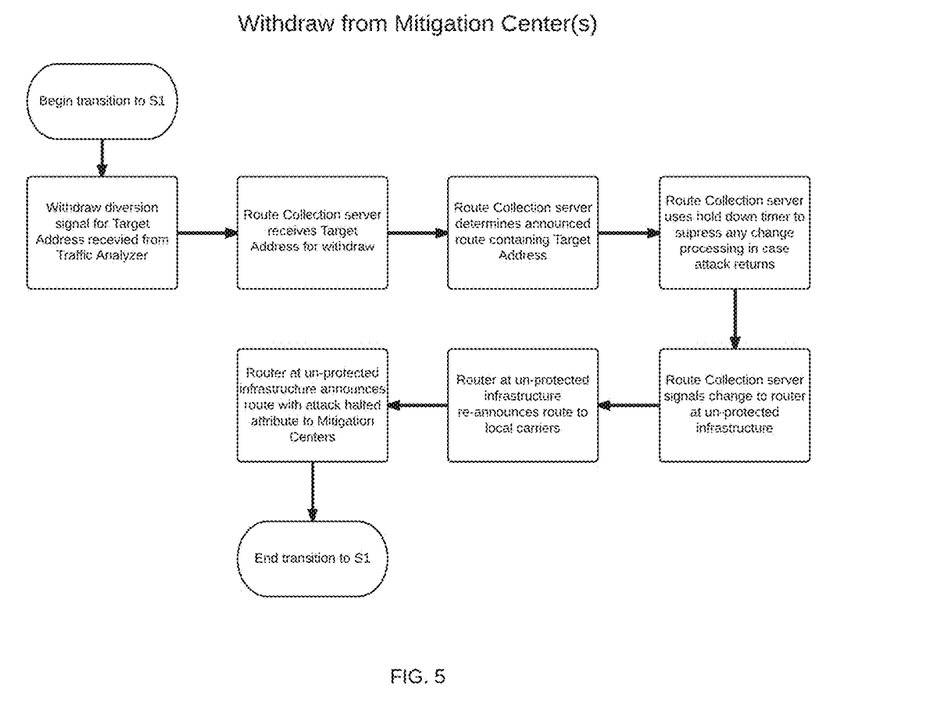
FIG. 5 shows the transition "Withdraw from Mitigation Center(s)" according to embodiments of the present invention.

FIG. 5 Shows the transition "Withdraw from Mitigation Center(s)." This logic diagram illustrates how the network can change from "Mitigation in Progress" to "Normal Traffic Pass-through" according to embodiments of the present invention.

The end of an attack can be determined in various ways. For example, a signature of an attack may no longer be detected, e.g., a number of requests to a network resource can be below a threshold. Once the end of the attack is identified, traffic can again be routed through a non-mitigation system (e.g., via BGP or DNS). The process of reinstalling a previous routing scheme that routes at least some traffic through a non-mitigation system is shown in FIG. 5.

For example, a diversion signal can be withdrawn, and a non-mitigation system (e.g., unprotected infrastructure) can re-announce to local carriers.

V. Computer System

Figure 6:
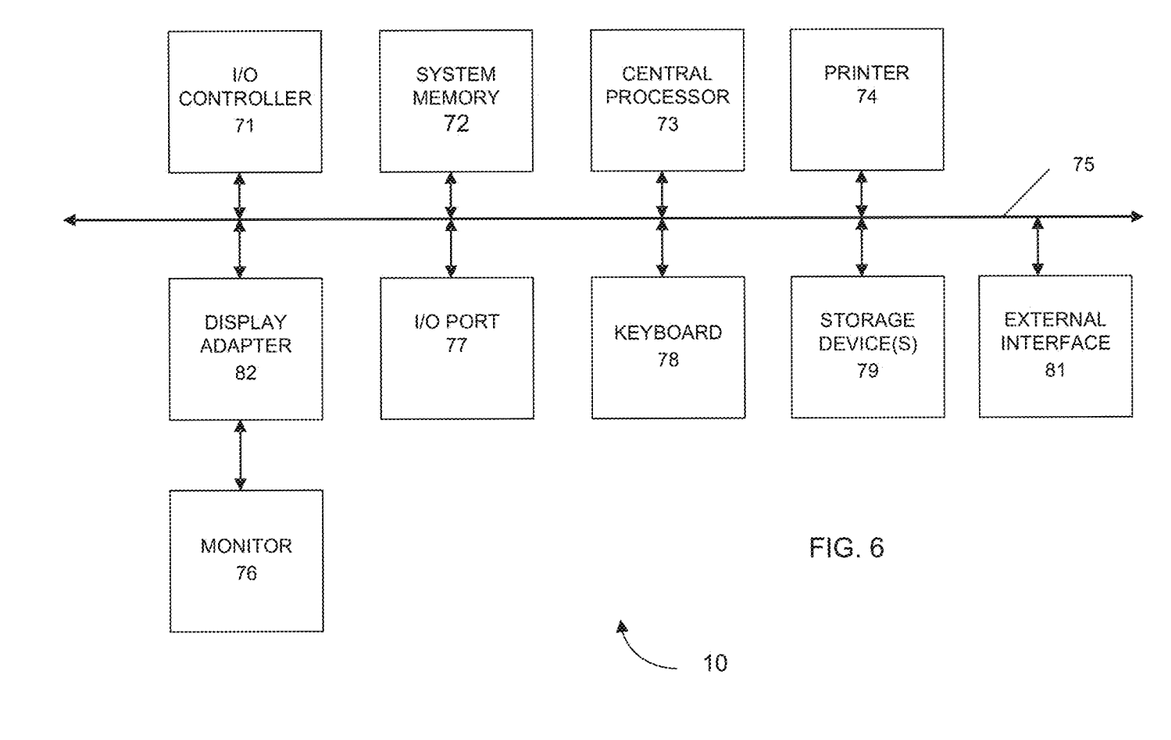
FIG. 6 shows a block diagram of an example computer system usable with system and methods according to embodiments of the present invention.

Any of the computer systems mentioned herein may utilize any suitable number of subsystems. Examples of such subsystems are shown in FIG. 6 in computer apparatus 10. In some embodiments, a computer system includes a single computer apparatus, where the subsystems can be the components of the computer apparatus. In other embodiments, a computer system can include multiple computer apparatuses, each being a subsystem, with internal components.

The subsystems shown in FIG. 6 are interconnected via a system bus 75. Additional subsystems such as a printer 74, keyboard 78, storage device(s) 79, monitor 76, which is coupled to display adapter 82, and others are shown. Peripherals and input/output (I/O) devices, which couple to I/O controller 71, can be connected to the computer system by any number of means known in the art such as input/output (I/O) port 77 (e.g., USB, FireWire®). For example, I/O port 77 or external interface 81 (e.g. Ethernet, Wi-Fi, etc.) can be used to connect computer system 10 to a wide area network such as the Internet, a mouse input device, or a scanner. The interconnection via system bus 75 allows the central processor 73 to communicate with each subsystem and to control the execution of instructions from system memory 72 or the storage device(s) 79 (e.g., a fixed disk, such as a hard drive or optical disk), as well as the exchange of information between subsystems. The system memory 72 and/or the storage device(s) 79 may embody a computer readable medium. Any of the data mentioned herein can be output from one component to another component and can be output to the user.

A computer system can include a plurality of the same components or subsystems, e.g., connected together by external interface 81 or by an internal interface. In some embodiments, computer systems, subsystem, or apparatuses can communicate over a network. In such instances, one computer can be considered a client and another computer a server, where each can be part of a same computer system. A client and a server can each include multiple systems, subsystems, or components.

It should be understood that any of the embodiments of the present invention can be implemented in the form of control logic using hardware (e.g. an application specific integrated circuit or field programmable gate array) and/or using computer software with a generally programmable processor in a modular or integrated manner. As used herein, a processor includes a single-core processor, multi-core processor on a same integrated chip, or multiple processing units on a single circuit board or networked. Based on the disclosure and teachings provided herein, a person of ordinary skill in the art will know and appreciate other ways and/or methods to implement embodiments of the present invention using hardware and a combination of hardware and software.

Any of the software components or functions described in this application may be implemented as software code to be executed by a processor using any suitable computer language such as, for example, Java, C, C++, C#, Objective-C, Swift, or scripting language such as Perl or Python using, for example, conventional or object-oriented techniques. The software code may be stored as a series of instructions or commands on a computer readable medium for storage and/or transmission, suitable media include random access memory (RAM), a read only memory (ROM), a magnetic medium such as a hard-drive or a floppy disk, or an optical medium such as a compact disk (CD) or DVD (digital versatile disk), flash memory, and the like. The computer readable medium may be any combination of such storage or transmission devices.

Such programs may also be encoded and transmitted using carrier signals adapted for transmission via wired, optical, and/or wireless networks conforming to a variety of protocols, including the Internet. As such, a computer readable medium according to an embodiment of the present invention may be created using a data signal encoded with such programs. Computer readable media encoded with the program code may be packaged with a compatible device or provided separately from other devices (e.g., via Internet download). Any such computer readable medium may reside on or within a single computer product (e.g. a hard drive, a CD, or an entire computer system), and may be present on or within different computer products within a system or network. A computer system may include a monitor, printer, or other suitable display for providing any of the results mentioned herein to a user.

Any of the methods described herein may be totally or partially performed with a computer system including one or more processors, which can be configured to perform the steps. Thus, embodiments can be directed to computer systems configured to perform the steps of any of the methods described herein, potentially with different components performing a respective steps or a respective group of steps. Although presented as numbered steps, steps of methods herein can be performed at a same time or in a different order. Additionally, portions of these steps may be used with portions of other steps from other methods. Also, all or portions of a step may be optional. Additionally, any of the steps of any of the methods can be performed with modules, circuits, or other means for performing these steps.

The specific details of particular embodiments may be combined in any suitable manner without departing from the spirit and scope of embodiments of the invention. However, other embodiments of the invention may be directed to specific embodiments relating to each individual aspect, or specific combinations of these individual aspects.

The above description of exemplary embodiments of the invention has been presented for the purposes of illustration and description. It is not intended to be exhaustive or to limit the invention to the precise form described, and many modifications and variations are possible in light of the teaching above. The embodiments were chosen and described in order to best explain the principles of the invention and its practical applications to thereby enable others skilled in the art to best utilize the invention in various embodiments and with various modifications as are suited to the particular use contemplated.

A recitation of "a", "an" or "the" is intended to mean "one or more" unless specifically indicated to the contrary. The use of "or" is intended to mean an "inclusive or," and not an "exclusive or" unless specifically indicated to the contrary.

All patents, patent applications, publications, and descriptions mentioned herein are incorporated by reference in their entirety for all purposes. None is admitted to be prior art.

What is claimed is:

1. A method comprising:
   providing a mitigation network comprising one or more mitigation systems:
      by the mitigation network:
         detecting an attack event targeting a customer network resource;

determining a routing scheme that routes network traffic to one or more mitigation systems of the mitigation network; and communicating the routing scheme to one or more routing devices to cause the one or more routing devices to update from a first Domain Name Service (DNS) zone associated with a non-mitigation system of the mitigation network to a second DNS zone associated with the one or more mitigation systems;

by the one or more mitigation systems:
receiving the network traffic; and
initiating scrubbing of the network traffic according to one or more mitigation rules.

2. The method as recited in claim 1, further comprising:
by the mitigation network:
detecting an end of the attack event; and
communicating another routing scheme corresponding to the non-mitigation system to the one or more routing devices.

3. The method as recited in claim 1, wherein a distributed system of devices determines the routing scheme based on signaling from a central server.

4. The method as recited in claim 3, further comprising:
determining one or more properties of any one or more of the following: the attack event, the mitigation network, and the customer network resource, and
wherein the routing scheme is selected based on the one or more determined properties.

5. The method as recited in claim 3, wherein a plurality of possible routing schemes are predetermined before the attack event is detected.

6. The method as recited in claim 1, wherein a central server of the mitigation network determines the routing scheme.

7. The method as recited in claim 1, wherein the customer network resource is a customer network or a computer hosting a website of the customer.

8. The method as recited in claim 1, wherein the attack event is a distributed denial of service attack.

9. A mitigation network comprising one or more mitigation systems:
the mitigation network configured to:
detect an attack event targeting a customer network resource;
determine a routing scheme that routes network traffic to one or more mitigation systems of the mitigation network; and
communicate the routing scheme to one or more routing devices to cause the one or more routing devices to update from a first Domain Name Service (DNS) zone associated with a non-mitigation system of the mitigation network to a second DNS zone associated with the one or more mitigation systems; and
the one or more mitigation systems configured to:
receive the network traffic; and
initiate scrubbing of the network traffic according to one or more mitigation rules.

10. The mitigation network as recited in claim 9, wherein the mitigation network is further configured to:
detect an end of the attack event; and
communicate another routing scheme corresponding to the non-mitigation system to the one or more routing devices.

11. The mitigation network as recited in claim 9, wherein a distributed system of devices determines the routing scheme based on signaling from a central server.

12. The mitigation network as recited in claim 11, wherein the mitigation network is further configured to:
determine one or more properties of any one or more of the following: the attack event, the mitigation network, and the customer network resource,
wherein the routing scheme is selected based on the one or more determined properties.

13. The mitigation network as recited in claim 11, wherein a plurality of possible routing schemes are predetermined before the attack event is detected.

14. The mitigation network as recited in claim 9, wherein a central server of the mitigation network determines the routing scheme.

15. The mitigation network as recited in claim 9, wherein the customer network resource is a customer network or a computer hosting a website of the customer.

16. The mitigation network as recited in claim 9, wherein the attack event is a distributed denial of service attack.

17. Non-transitory computer readable media comprising instructions that, when executed by one or more processors associated with a mitigation network comprising one or more mitigation systems, cause the one or more processors to:
detect an attack event targeting a customer network resource;
determine a routing scheme that routes network traffic to one or more mitigation systems of the mitigation network; and
communicate the routing scheme to one or more routing devices to cause the one or more routing devices to update from a first Domain Name Service (DNS) zone associated with a non-mitigation system of the mitigation network to a second DNS zone associated with the one or more mitigation systems; and
receive the network traffic; and
initiate scrubbing of the network traffic according to one or more mitigation rules.

18. The non-transitory computer readable media as recited in claim 17, wherein the instructions further cause the one or more processors to:
detect an end of the attack event; and
communicate another routing scheme corresponding to the non-mitigation system to the one or more routing devices.

19. The non-transitory computer readable media as recited in claim 17, wherein the instructions further cause the one or more processors to determine the routing scheme based on signaling from a central server.

20. The non-transitory computer readable media as recited in claim 19, wherein the instructions further cause the one or more processors to:
determine one or more properties of any one or more of the following: the attack event, the mitigation network, and the customer network resource,
wherein the routing scheme is selected based on the one or more determined properties.

* * * * *